United States Patent
Senshiki

(10) Patent No.: US 11,061,512 B2
(45) Date of Patent: Jul. 13, 2021

(54) PROJECTOR, IMAGE DISPLAY SYSTEM, AND METHOD FOR CONTROLLING IMAGE DISPLAY SYSTEM

(71) Applicant: SEIKO EPSON CORPORATION, Tokyo (JP)

(72) Inventor: Hiroki Senshiki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/798,910

(22) Filed: Feb. 24, 2020

(65) Prior Publication Data

US 2020/0272277 A1 Aug. 27, 2020

(30) Foreign Application Priority Data

Feb. 25, 2019 (JP) .............................. JP2019-031334

(51) Int. Cl.
*G06F 3/042* (2006.01)
*G06T 11/60* (2006.01)
*H04N 9/31* (2006.01)

(52) U.S. Cl.
CPC ............ *G06F 3/0425* (2013.01); *G06T 11/60* (2013.01); *H04N 9/3185* (2013.01); *H04N 9/3194* (2013.01)

(58) Field of Classification Search
CPC ...... G06F 3/0425; G06F 3/0418; G06T 11/60; H04N 9/3185; H04N 9/3194
See application file for complete search history.

(56) References Cited

U.S. PATENT DOCUMENTS

| | | | | |
|---|---|---|---|---|
| 9,004,698 B2* | 4/2015 | Kilcher | ................ | H04N 9/3129 353/69 |
| 9,134,814 B2* | 9/2015 | Tamura | ................. | G06F 3/0386 |
| 9,438,843 B2* | 9/2016 | Nakade | ................... | G06F 3/017 |
| 9,519,379 B2* | 12/2016 | Ichieda | ................... | G09G 3/02 |
| 9,654,750 B2* | 5/2017 | Kunieda | ............. | G03B 21/147 |
| 9,678,413 B2* | 6/2017 | Furui | ................... | H04N 9/3185 |
| 9,746,940 B2* | 8/2017 | Ichieda | ................ | G06F 3/0418 |

(Continued)

FOREIGN PATENT DOCUMENTS

| | | |
|---|---|---|
| JP | 2006-025244 A | 1/2006 |
| JP | 2014-131326 A | 7/2014 |
| JP | 2015-158890 A | 9/2015 |

*Primary Examiner* — Vinh T Lam
(74) *Attorney, Agent, or Firm* — Oliff PLC

(57) ABSTRACT

A projector includes an image projection section projecting an image on a projection surface, an imager capturing a surface image to produce a captured image, a controller causing the image projection section to project a calibration image and causing the imager to capture the projected calibration image, a computing section calculating conversion information for converting a position in the captured image into a position in the projection image based on the captured image as a result of the calibration image imaging, and a detector searching the projection image and detecting a pointing position at which a light emitting pen pointing at the projection surface has pointed based on the conversion information and captured image as a result of the light emitting pen imaging, and the computing section calculates a projection distance between the projector and projection surface based on the captured image as a result of the calibration image imaging.

11 Claims, 9 Drawing Sheets

(56) References Cited

U.S. PATENT DOCUMENTS

| | | | |
|---|---|---|---|
| 9,930,307 B1* | 3/2018 | Kursula | H04N 9/3147 |
| 9,996,909 B2* | 6/2018 | Masuko | G06T 5/006 |
| 10,080,002 B2* | 9/2018 | Kasuga | H04N 9/3182 |
| 2014/0306939 A1* | 10/2014 | Tamura | G06F 3/0425 |
| | | | 345/178 |
| 2015/0009183 A1* | 1/2015 | Ling | G06F 3/0304 |
| | | | 345/175 |
| 2016/0142691 A1* | 5/2016 | Kobiki | H04N 9/3194 |
| | | | 348/746 |
| 2016/0173842 A1* | 6/2016 | De La Cruz | H04N 9/3185 |
| | | | 353/70 |
| 2016/0295184 A1* | 10/2016 | Ishikawa | H04N 3/223 |
| 2016/0328089 A1 | 11/2016 | Nguyen et al. | |
| 2017/0031530 A1* | 2/2017 | Ikeda | G06F 3/0483 |
| 2017/0192528 A1* | 7/2017 | Naess | G06F 3/0304 |
| 2017/0208307 A1* | 7/2017 | Ichieda | H04N 9/3185 |
| 2017/0220196 A1* | 8/2017 | Moussakhani | G06F 3/04186 |
| 2017/0339382 A1* | 11/2017 | Furui | H04N 5/23203 |
| 2020/0193568 A1* | 6/2020 | Aoyanagi | G03B 21/02 |

\* cited by examiner

PROJECTOR, IMAGE DISPLAY SYSTEM, AND METHOD FOR CONTROLLING IMAGE DISPLAY SYSTEM

The present application is based on, and claims priority from JP Application Serial Number 2019-031334, filed Feb. 25, 2019, the disclosure of which is hereby incorporated by reference herein in its entirety.

BACKGROUND

1. Technical Field

The present disclosure relates to a projector, an image display system, and a method for controlling the image display system.

2. Related Art

There is a known projector that includes a camera that captures an image of a projection surface on which an image is projected and can detect a pointing position at which a pointing element that points at the projection surface has pointed. JP-A-2015-158890 describes that one example of initialization necessary for derivation of a position in a projection image having been projected from a position in a captured image having been captured is performing calibration that associates the position in the projection image with the position in the captured image. Calibration is classified into automatic calibration that requires no user's operation and manual calibration that requires a user's operation, and the projector described in JP-A-2015-158890 performs one of the two types of calibration and then measures the distance to the projection surface. The measured distance can be used, for example, to correct the pointing position and adjust the condition under which the pointing position is detected.

The projector described in JP-A-2015-158890, however, measures the distance to the projection surface independently of the calibration and therefore has a problem of a certain period spent for the initialization.

SUMMARY

A projector according to the present application detects a pointing position at which a pointing element has pointed and includes a projection section that projects a projection image on a projection surface; an imager that captures an image of the projection surface to produce a captured image; a controller that causes the projection section to project a calibration image as the projection image and causes the imager to capture an image of the projected calibration image; a computing section that calculates conversion information for converting a position in the captured image into a position in the projection image based on the captured image produced when the imager captures an image of the calibration image; and a detector that detects the pointing position in the projection image based on the captured image produced when the imager captures an image of the pointing element that points at the projection surface and the conversion information calculated by the computing section, in which the computing section calculates a projection distance that is a distance between the projector and the projection surface based on the captured image produced when the imager captures an image of the calibration image.

In the projector described above, the detector may correct the detected pointing position by using the calculated projection distance.

The projector described above, may further include a drawing section that produces a drawn image based on a trajectory of the pointing position corrected by the detector using the projection distance; and a combiner that combines the drawn image produced by the drawing section with the projection image.

An image display system according to the present application detects a pointing position at which a pointing element has pointed, and includes a projection section that projects a projection image on a projection surface; an imager that captures an image of the projection surface to produce a captured image; a controller that causes the projection section to project a calibration image as the projection image and causes the imager to capture an image of the projected calibration image; a computing section that calculates conversion information for converting a position in the captured image into a position in the projection image based on the captured image produced when the imager captures an image of the calibration image; and a detector that detects the pointing position in the projection image based on the captured image produced when the imager captures an image of the pointing element that points at the projection surface and the conversion information calculated by the computing section, in which the computing section calculates a projection distance that is a distance between the projection section and the projection surface based on the captured image produced when the imager captures an image of the calibration image.

In the image display system described above, the detector may correct the detected pointing position by using the calculated projection distance.

The image display system described above may further include a drawing section that produces a drawn image based on a trajectory of the pointing position corrected by the detector using the projection distance; and a combiner that combines the drawn image produced by the drawing section with the projection image.

A method for controlling an image display system according to the present application is a method for controlling an image display system including a projection section that projects a projection image on a projection surface and an imager that captures an image of the projection surface to produce a captured image and detects a pointing position at which a pointing element that points at the projection surface has pointed. The method includes causing the projection section to project a calibration image as the projection image; causing the imager to capture an image of the projected calibration image; calculating conversion information for converting a position in the captured image into a position in the projection image based on the captured image produced when the imager captures an image of the calibration image; detecting the pointing position in the projection image based on the captured image produced when the imager captures an image of the pointing element that points at the projection surface and the calculated conversion information; and calculating a projection distance that is a distance between the projection section and the projection surface based on the captured image produced when the imager captures an image of the calibration image.

In the method for controlling an image display system described above, the detected pointing position is corrected by using the calculated projection distance.

The method for controlling an image display system described above may further includes producing a drawn image based on a trajectory of the pointing position corrected by using the projection distance; and combining the produced drawn image with the projection image.

DESCRIPTION OF EXEMPLARY EMBODIMENTS

An image display system according to an embodiment of the present disclosure will be described below with reference to the drawings.

Figure 1:
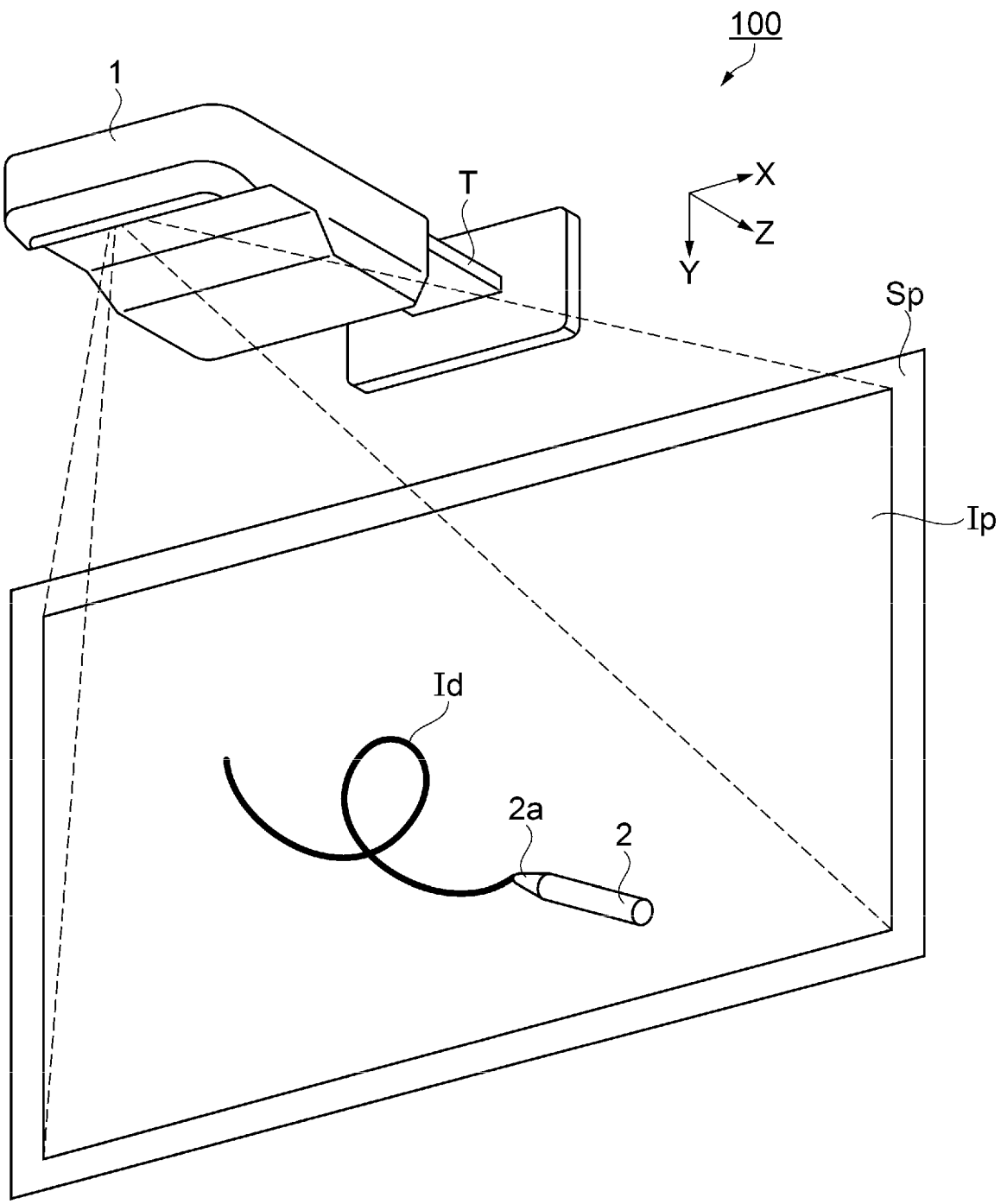
FIG. 1 is a perspective view showing an image display system.

FIG. 1 is a perspective view showing an image display system 100 according to the present embodiment.

The image display system 100 includes a projector 1 and a light emitting pen 2 as a pointing element, as shown in FIG. 1. The projector 1 forms a projection image Ip based on externally inputted image information or internally stored image information and projects and displays the projection image Ip on a projection surface Sp as a display surface. The projector 1 according to the present embodiment is fixed to a wall surface via a fixing member T and projects the projection image Ip toward the projection surface Sp installed along the same wall surface. The projection surface Sp can, for example, be a screen or a whiteboard having a rectangular display area, and the projection image Ip may instead be projected on a wall surface itself. The distance between the projector 1 and the projection surface Sp can be adjusted by the fixing member T, and increasing the separation of the projector 1 from the projection surface Sp enlarges the displayed projection image Ip.

The light emitting pen 2 has a tip where a light emitter 2a, which emits infrared light, is provided, and includes a pressing operation detector that is not shown but detects that the tip has pressed the projection surface Sp, that is, the tip has come into contact with the projection surface Sp. The light emitter 2a keeps blinking in a predetermined light emission sequence when the light emitting pen 2 is in operation. The light emitter 2a switches the light emission sequence to another in accordance with whether or not the light emitting pen 2 is in contact with the projection surface Sp. The projector 1 can therefore identify whether or not the light emitting pen 2 is in contact with the projection surface Sp based on the light emission sequence in accordance with which the light emitter 2a emits the light. The light emitting pen 2 may emit light that belongs to a wavelength region different from the wavelength region to which the infrared light belongs.

The projector 1 can capture an image over the range over which the projection image Ip is projected. The projector 1 detects the light emitted from the light emitting pen 2 in the captured image and detects the position of the detected light as a pointing position at which the light emitting pen 2 has pointed. Further, the projector 1 senses whether or not the light emitting pen 2 is in contact with the projection surface Sp based on the light emission sequence of the detected light. When the pointing position changes with the light emitting pen 2 being in contact with the projection surface Sp, the projector 1 can produce an image Id, which is formed of a line drawn along the trajectory of the pointing position, and display the image Id with the image Id superimposed on the projection image Ip. The image Id is hereinafter also referred to as a "drawn image Id."

In the present specification, an axis X is a coordinate axis extending along the long edges of the rectangular projection surface Sp so installed that the longitudinal direction thereof coincides with the horizontal direction, and a direction +X is the rightward direction in the plan view of the projection surface Sp. An axis Y is a coordinate axis perpendicular to the axis X and extending along the short edges of the projection surface Sp, and a direction +Y is the downward direction. An axis Z is a coordinate axis perpendicular to the projection surface Sp, that is, the plane XY, and a direction +Z is the direction extending from the projector 1 toward the projection surface Sp and intersecting the projection surface Sp at right angles.

Figure 2:
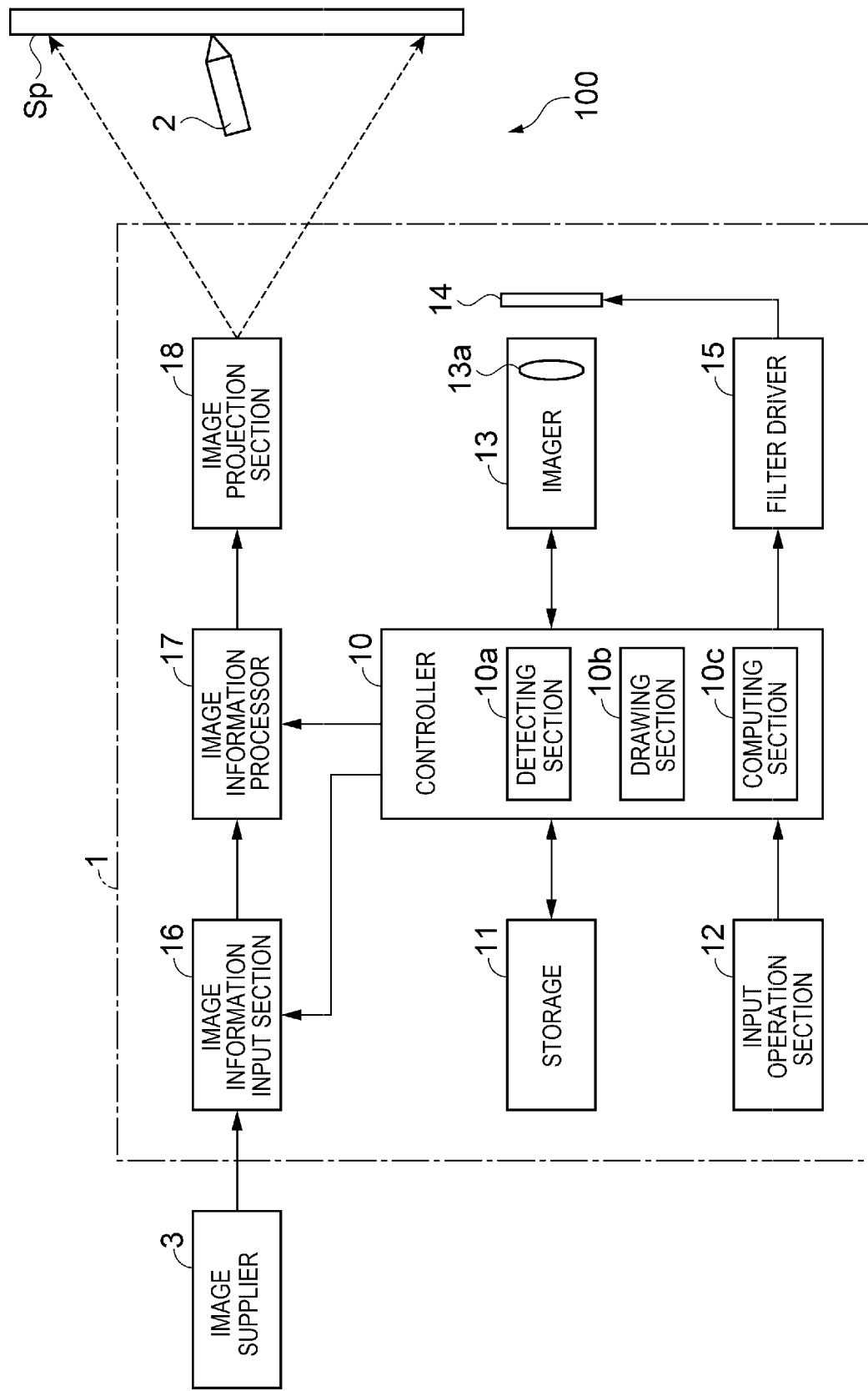
FIG. 2 is a block diagram showing a schematic configuration of a projector.
Figure 3:
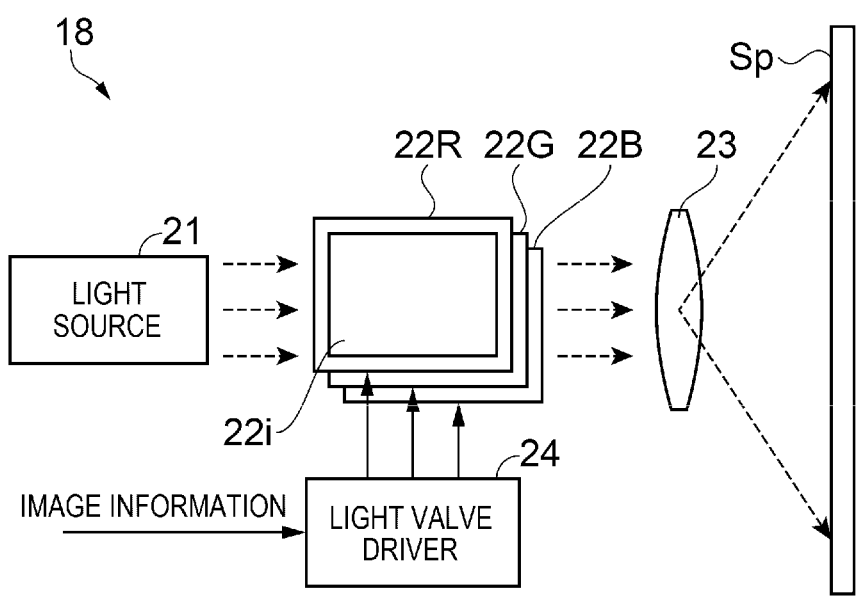
FIG. 3 is a block diagram showing a schematic configuration of an image projection section provided in the projector.

FIG. 2 is a block diagram showing a schematic configuration of the projector 1, and FIG. 3 is a block diagram showing a schematic configuration of an image projection section 18 provided in the projector 1.

The projector 1 includes a controller 10, a storage 11, an input operation section 12, an imager 13, an infrared transmitting filter 14, a filter driver 15, an image information input section 16, an image information processor 17 as a combiner, and an image projection section 18 as a projection section with the components described above integrated with one another, as shown in FIG. 2. The projector 1 projects the projection image Ip on the projection surface Sp via the image projection section 18 based on image information inputted from the image information input section 16.

The controller 10 includes one or more processors and operates in accordance with a control program stored in the storage 11 to oversee and control the action of the projector 1.

The storage 11 includes a memory, such as a RAM (random access memory) and a ROM (read only memory). The RAM is used to temporarily store a variety of data and other pieces of information, and the ROM stores the control program, control data, and other pieces of information for controlling the action of the projector 1.

The input operation section 12 includes a plurality of operation keys that allow a user to issue a variety of instructions to the projector 1. The operation keys provided on the input operation section 12 include a power key for switching the powered-on state to the powered-off state of the projector 1 and vice versa, a menu key for displaying a menu image for a variety of settings, a direction key for selecting an item on the menu image, and other keys. When the user operates any of the variety of operation keys on the input operation section 12, the input operation section 12 outputs an operation signal according to the content of the user's operation to the controller 10. A remote control that is not shown but allows remote operation of the projector 1 may be used as the input operation section 12. In this case, the remote control issues an infrared light operation signal according to the content of the user's operation, and a remote control signal receiver that is not shown receives the operation signal and forwards the signal to the controller 10.

The imager 13 is a camera including an imaging device that is not shown, such as a CCD (charge coupled device) sensor and a CMOS (complementary metal oxide semiconductor) sensor, and an imaging optical system 13a, which is formed, for example, of a lens that forms an image on the imaging device. The imager 13 captures an image formed of the infrared light emitted from the light emitting pen 2 via the infrared transmitting filter 14, which absorbs visible light and transmits infrared light. The imager 13 captures an image over a range containing the projection image Ip on the projection surface Sp under the control of the controller 10 and outputs image information that is the result of the imaging to the controller 10. An image captured by the imager 13 is hereinafter also referred to as a "captured image," and the image information outputted from the imager 13 is hereinafter also referred to as a "captured image information."

The filter driver 15, although not illustrated in detail, includes a moving mechanism for changing the position of the infrared transmitting filter 14 and a drive circuit, such as a motor, for driving the moving mechanism. The filter driver 15 can move the infrared transmitting filter 14 under the control of the controller 10 to a position where the infrared transmitting filter 14 is not part of the imaging optical system 13. In this case, the imager 13 captures an image formed of visible light that does not pass through the infrared transmitting filter 14. That is, the filter driver 15 switches the state in which the imager 13 captures an image formed of the infrared light via the infrared transmitting filter 14 to the state in which the imager 13 captures an image formed of visible light via no infrared transmitting filter 14 and vice versa under the control of the controller 10.

The controller 10 of the projector 1 includes a detecting section 10a, a drawing section 10b, and a computing section 10c as functional blocks achieved by the control program.

The detecting section 10a detects the pointing position at which the light emitting pen 2 has pointed based on the captured image captured by the imager 13 and converts the pointing position in the captured image into a pointing position in the projection image Ip. That is, the detecting section 10a detects the pointing position at which the light emitting pen 2 has pointed in the projection image Ip. The drawing section 10b produces the drawn image Id based on the pointing position converted by the detecting section 10a. The computing section 10c calculates, for example, conversion information that allows the detecting section 10a to convert the pointing position in the captured image into the pointing position in the projection image Ip. The detecting section 10a, the drawing section 10b, and the computing section 10c will be described later in detail.

The image information input section 16 is connected to an external image supplier 3, such as a computer and an image reproduction apparatus, and receives image information supplied from the image supplier 3. The image information input section 16 can also receive image information stored in the storage 11 and supplied from controller 10. The image information input section 16 outputs the inputted image information to the image information processor 17.

The image information processor 17 includes a frame memory that is not shown. The image information processor 17 stores the image information inputted from the image information input section 16 in the frame memory, performs a variety of types of processing on the image information in the frame memory under the control of the controller 10, and outputs the processed image information to the image projection section 18. For example, the image information processor 17 performs the following processing on the image information as required: adjustment of the image quality, such as the brightness and contrast; and composition of the projection image Ip and the drawn image Id. The image information processor 17 outputs the processed image information to a light valve driver 24 (see FIG. 3) of the image projection section 18.

The image information input section 16 and the image information processor 17 may be formed of one or more processors or a dedicated processor, such as an ASIC (application specific integrated circuit) and an FPGA (field programmable gate array).

The image projection section 18 includes a light source 21, three liquid crystal light valves 22R, 22G, and 22B as light modulators, a projection system 23, the light valve driver 24, and other components, as shown in FIG. 3. The image projection section 18 operates as follows: The liquid crystal light valves 22R, 22G, and 22B modulate light outputted from the light source 21 to form image light; and the projection system 23 including at least one of a lens and a mirror projects the image light to display an image on the projection surface Sp.

The light source 21 includes a discharge-type light source lamp, such as an ultrahigh-pressure mercury lamp and a metal halide lamp, or a solid-state light source, such as a light emitting diode and a semiconductor laser. The light outputted from the light source 21 is converted by an optical integration system that is not shown into light having a substantially uniform luminance distribution, which is then separated by a color separation system that is not shown into color light components of red (R), green (G), and blue (B), which are the three primary colors of light, and the color light components are then incident on the liquid crystal light valves 22R, 22G, and 22B.

The liquid crystal light valves 22R, 22G, and 22B are each formed, for example, of a transmissive liquid crystal panel including a liquid crystal material encapsulated between a pair of transparent substrates. The liquid crystal panels each have a rectangular pixel area 22i formed therein, and the pixel area 22i is formed of a plurality of pixels arranged in a matrix. Drive voltage is applicable to the liquid crystal material on a pixel basis.

The light valve driver 24 forms the projection image Ip in the pixel area 22i of each of the liquid crystal light valves 22R, 22G, and 22B. Specifically, the light valve driver 24 applies drive voltage according to the image information inputted from the image information processor 17 to each of the pixels in the pixel area 22i to allow the pixel to have optical transmittance according to the image information. The light outputted from the light source 21 passes through the pixel area 22i of each of the liquid crystal light valves 22R, 22G, and 22B and is modulated thereby on a pixel basis into image light according to the image information on a color light basis. The thus formed color image light fluxes are combined with one another on a pixel basis by a light combining system that is not shown into image light representing a color image, which is then enlarged by the projection system 23 and displayed thereby on the projection surface Sp. As a result, the projection image Ip is displayed on the projection surface Sp.

Figure 4:
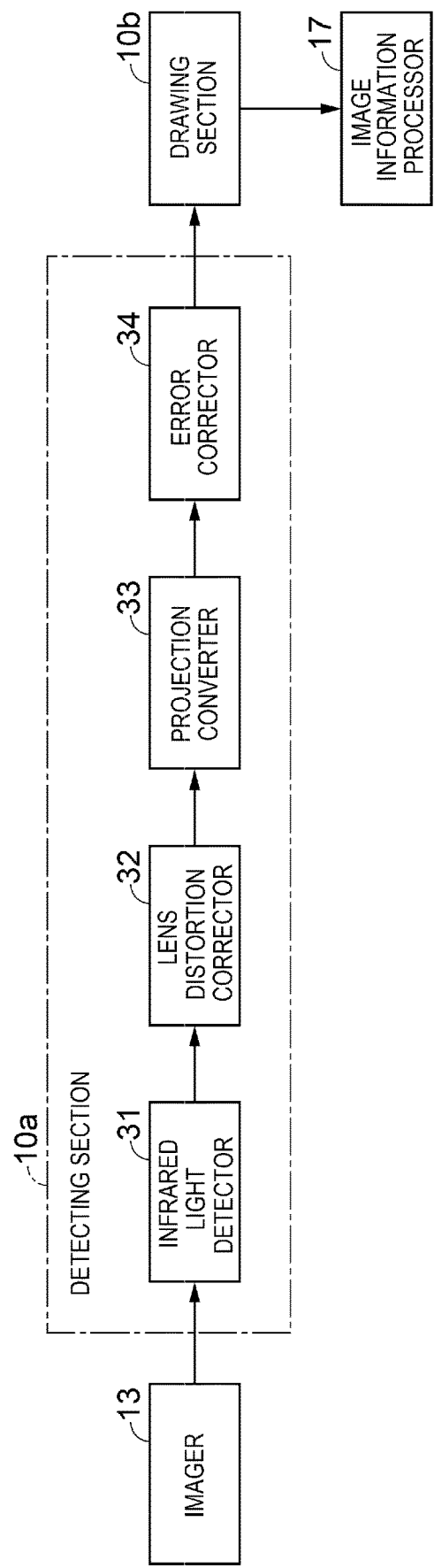
FIG. 4 is a functional block diagram showing a schematic configuration of a detecting section.

FIG. 4 is a functional block diagram showing a schematic configuration of the detecting section 10a. The functional blocks are achieved by the control program.

The detecting section 10a includes an infrared light detector 31, a lens distortion corrector 32, a projection converter 33, and an error corrector 34, as shown in FIG. 4.

The infrared light detector 31 searches the captured image and detects the infrared light emitted from the light emitting pen 2 based on the captured image information inputted from the imager 13. The infrared light detector 31 locates an image having brightness greater than or equal to a predetermined threshold and having a size greater than or equal to a predetermined threshold out of infrared light images contained in the captured image, takes the detected image as the light emitted from the light emitting pen 2, and detects the position of the image as the pointing position at which the light emitting pen 2 has pointed. Further, the infrared light detector 31 determines the light emission sequence in accordance of which the light emitting pen 2 emits light based on the captured image information acquired over multiple times to sense whether or not the light emitting pen 2 has come into contact with the projection surface Sp.

The lens distortion corrector 32 corrects distortion resulting from the characteristics of the imaging optical system 13a provided in the imager 13. The distortion depends on the characteristics of the imaging optical system 13a and can therefore be corrected by using known correction information according to the imaging optical system 13a. The correction information is stored in the form of a look-up table (LUT) in the storage 11 in advance.

The projection converter 33 uses projection conversion to correct trapezoidal distortion of the captured image resulting from discrepancy between the optical axis of the projection system 23 and the optical axis of the imaging optical system 13a of the imager 13. Since the trapezoidal distortion varies in accordance with the state in which the projector 1 is installed with respect to the projection surface Sp, the projection conversion is performed by using a calibration performed after the projector 1 is installed. The correction allows conversion of the pointing position detected in the captured image into a pointing position in the projection image Ip. The projector 1 can then carry out a process in accordance with the pointing position at which the light emitting pen 2 has pointed in the projection image Ip on the projection surface Sp. The calibration will be described later.

The error corrector 34 corrects an error in the pointing position resulting from discrepancy between the position on the projection surface Sp at which the light emitting pen 2 has actually pointed and the position of the light emitter 2a of the light emitting pen 2.

Figure 5:
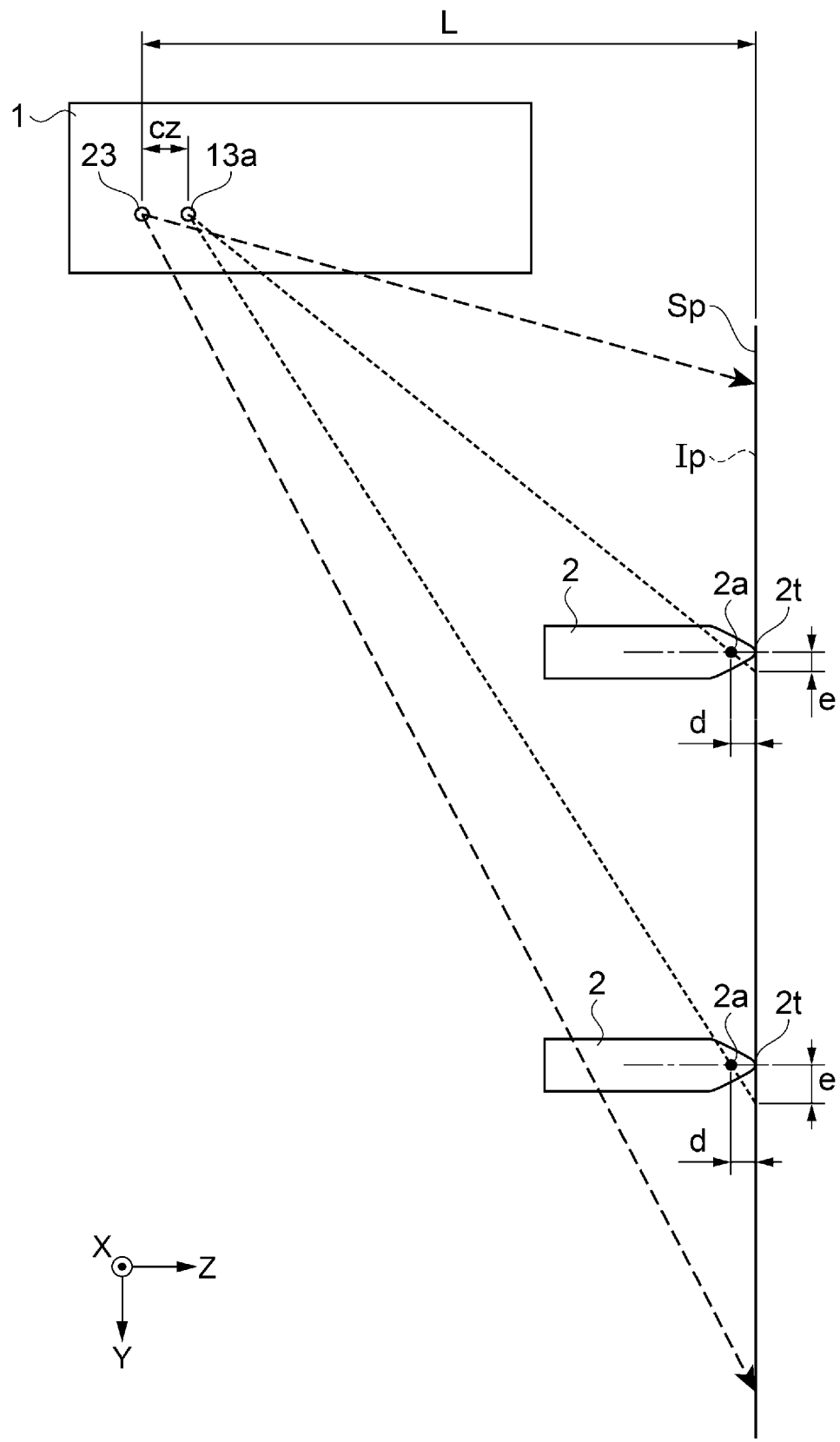
FIG. 5 is a descriptive diagram for describing correction of a detection error in a pointing position.

FIG. 5 is a descriptive diagram for describing the correction of the detection error in the pointing position and is a side view of the image display system 100 viewed from the +X side. FIG. 5 shows that the light emitting pen 2 is pointing at different positions in the direction along the axis Y on the projection surface Sp.

The light emitter 2a of the light emitting pen 2 is so disposed as to be shifted inward by a distance d from a tip 2t, which comes into contact with the projection surface Sp, as shown in FIG. 5. The distance d therefore causes an error e to be added to the detected pointing position. That is, the infrared light detector 31 detects a position that deviates by the error e from the position where the tip 2t of the light emitting pen 2 is in contact with the projection surface Sp. The position is corrected by the error corrector 34. Provided that the distance d is fixed, the error e changes in accordance with the coordinates of the pointing position and a projection distance L, which is the distance between the projector 1 and the projection surface Sp, and the error corrector 34 therefore corrects the error e based on the coordinates of the pointing position and the projection distance L. The projection distance L is calculated based on the calibration performed after the projector 1 is installed. In FIG. 5, the projection distance L is the distance to the projector 1 in the direction of a normal to the projection surface Sp. FIG. 5 shows only an error in the direction along the axis Y, and a similar error is present also in the direction along the axis X. The error corrector 34 corrects the two errors.

Referring back to FIG. 4, the detecting section 10a outputs the coordinates of the pointing position having been converted into the position in the projection image Ip and having undergone the correction of the error e to the drawing section 10b.

The drawing section 10b produces the drawn image Id in the pointing position at which the light emitting pen 2 has pointed and which has been detected by the detecting section 10a. For example, the drawing section 10b places a point-shaped drawn image Id in the pointing position at which the light emitting pen 2 has pointed. The drawing section 10b adds the point-shaped drawn image Id to the previous one in accordance with a change in the pointing position to produce a line-shaped drawn image Id formed of a plurality of points concatenated with each other along the trajectory of the pointing position. The drawn image Id produced by the drawing section 10b is outputted to the image information processor 17, which then combines the drawn image Id with the projection image Ip. The drawing section 10b is not necessarily configured to produce a line-shaped drawn image Id along the trajectory of the pointing position and may instead be configured, for example, to place an arrow-shaped pointer image in the pointing position.

Figure 6:
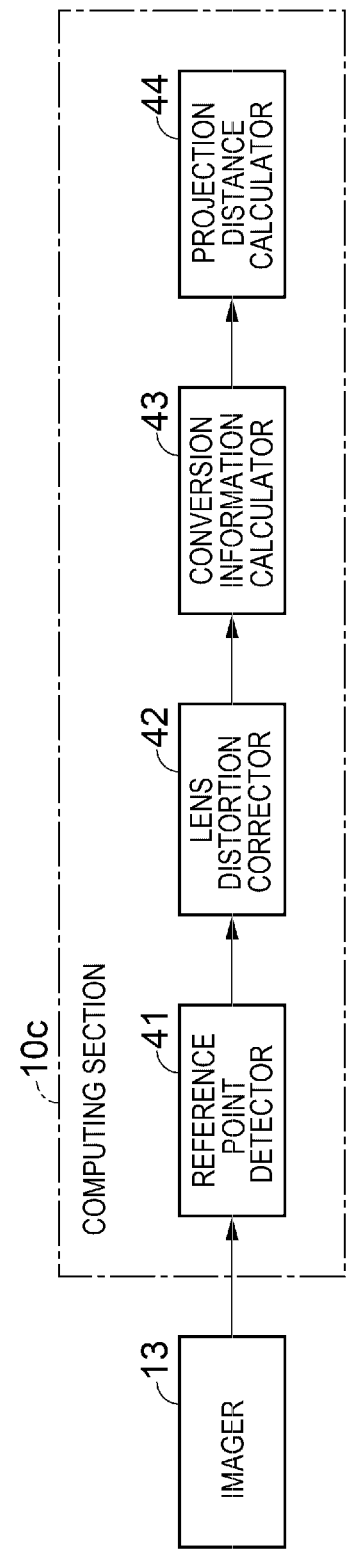
FIG. 6 is a functional block diagram showing a schematic configuration of a computing section.

FIG. 6 is a functional block diagram showing a schematic configuration of the computing section 10c. The functional blocks are achieved by the control program.

The computing section 10c includes a reference point detector 41, a lens distortion corrector 42, a conversion information calculator 43, and a projection distance calculator 44, as shown in FIG. 6, and calculates the conversion information, which allows the detecting section 10a to convert the pointing position in the captured image into the pointing position in the projection image Ip, and the projection distance L. The process of calculating the conversion information and the projection distance L is called "calibration." The conversion information and the projection distance L are determined in accordance with the positional relationship between the projector 1 and the projection surface Sp, and it is therefore necessary to perform the calibration over again whenever the state in which the projector 1 is installed with respect to the projection surface Sp is changed.

The calibration is performed in one of the following two forms: manual calibration performed based on the user's operation; and automatic calibration performed based on no user's operation. In the manual calibration, the projector 1 projects a plurality of marks on the projection surface Sp, and the user is prompted to sequentially touch the marks with the light emitting pen 2. The projector 1 then searches the captured image captured by the imager 13 and detects the pointing position at which the light emitting pen 2 has pointed to associate the coordinates in the captured image with the coordinates in the projection image Ip. On the other hand, in the automatic calibration, the projector 1 projects a calibration image including a plurality of reference points on the projection surface Sp, the imager 13 captures an image of the calibration image to produce a captured image, and the projector 1 detects the reference points in the captured image to associate the coordinates in the captured image with the coordinates in the projection image Ip. In the present embodiment, it is assumed that the automatic calibration is performed as the calibration.

Figure 7:
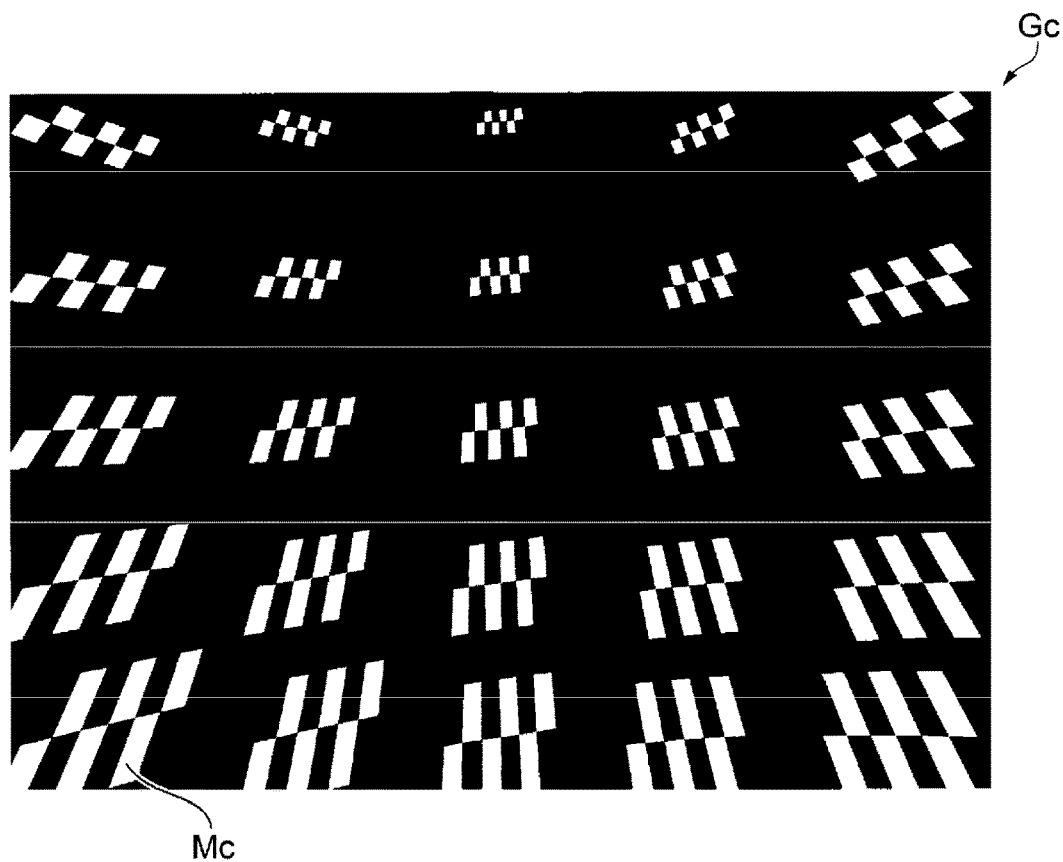
FIG. 7 is a descriptive diagram showing an example of a calibration image.

FIG. 7 is a descriptive diagram showing an example of the calibration image projected on the projection surface Sp.

A calibration image Gc has 5×5=25 white marks Mc arranged in a black background, as shown in FIG. 7. The marks Mc each include a plurality of quadrangles arranged in a checker pattern, and a predetermined one of a plurality of intersections where vertices of the quadrangles face each other is used as a reference point. In the calibration image Gc, the marks Mc are each deformed in accordance with the position thereof, and the marks Mc therefore have different sizes and shapes. Image information representing the calibration image Gc is stored in the storage 11 in advance.

When the user issues an instruction of execution of the calibration, the controller 10 reads the image information on the calibration image Gc from the storage 11 and outputs the image information to the image information input section 16 to cause the image projection section 18 to project the calibration image Gc. Further, the controller 10 causes the imager 13 to capture an image of the projected calibration image Gc. In this process, the controller 10 causes the filter driver 15 to move the infrared transmission filter 14 and causes the imager 13 to capture an image formed of visible light.

Figure 8:
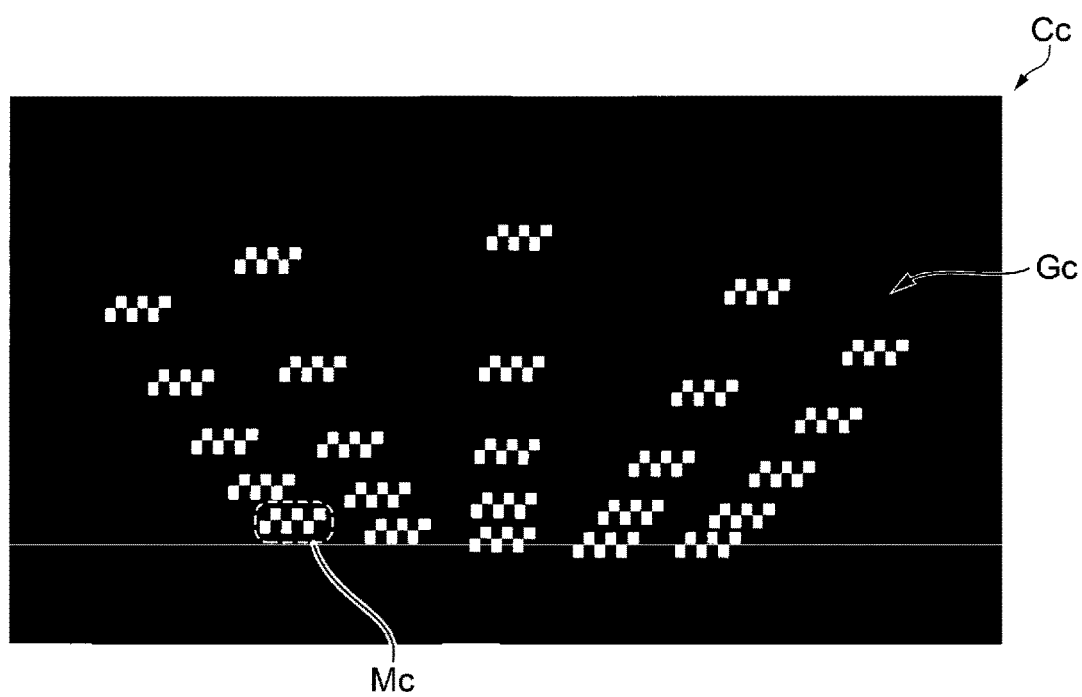
FIG. 8 shows a captured image that is an image as a result of imaging of the calibration image.

FIG. 8 shows a captured image Cc, which is an image as a result of imaging of the calibration image Gc.

The captured image Cc contains the projected calibration image Gc, as shown in FIG. 8. An image of the calibration image Gc is so captured that the calibration image Gc is distorted in accordance with the characteristics of the imaging optical system 13a and the orientation of the optical axis of the imaging optical system 13a, but the 25 marks Mc are so disposed in the captured image Cc as to have substantially the same shape and substantially the same size. That is, the marks Mc in the calibration image Gc shown in FIG. 7 have been so deformed in advance that the distortion resulting from the imaging is canceled, whereby the reference points in the calibration image Gc are readily detected.

Referring back to FIG. 6, the reference point detector 41 detects the 25 reference points based on the captured image Cc produced when the imager 13 captures an image of the projected calibration image Gc. The lens distortion corrector 42 has the same function as that of the lens distortion corrector 32 of the detecting section 10a and corrects distortion that results from the characteristics of the imaging optical system 13a and occurs at the 25 reference points detected by the reference point detector 41.

The conversion information calculator 43 calculates a projection conversion coefficient for correcting the trapezoidal distortion based on the corrected coordinates of the 25 reference points. Specifically, the conversion information calculator 43 calculates the projection conversion coefficient as the conversion information by associating the corrected coordinates of each of the 25 reference points in the captured image Cc with the coordinates thereof in the projection image Ip, which is known information. The projection conversion coefficients calculated by the conversion information calculator 43 are stored in the storage 11, used by the projection converter 33 of the detecting section 10a, and also used by the projection distance calculator 44.

The projection distance calculator 44 calculates the projection distance L, which is the distance between the projector 1 and the projection surface Sp. The projection distance L is the distance between a reference position of the projector 1 and the projection surface Sp, and a distance along the axis Z and between the projection system 23 of the projector 1 and the projection surface Sp is calculated as the projection distance L in the present embodiment. The projection distance L is, however, not necessarily used, and another index, for example, the distance between the projection system 23 and the center of the projected projection image Ip, may be employed. The reference position of the projector 1 is not limited to the position of the projection system 23 and may, for example, be the position of the imaging optical system 13a.

Figure 9:
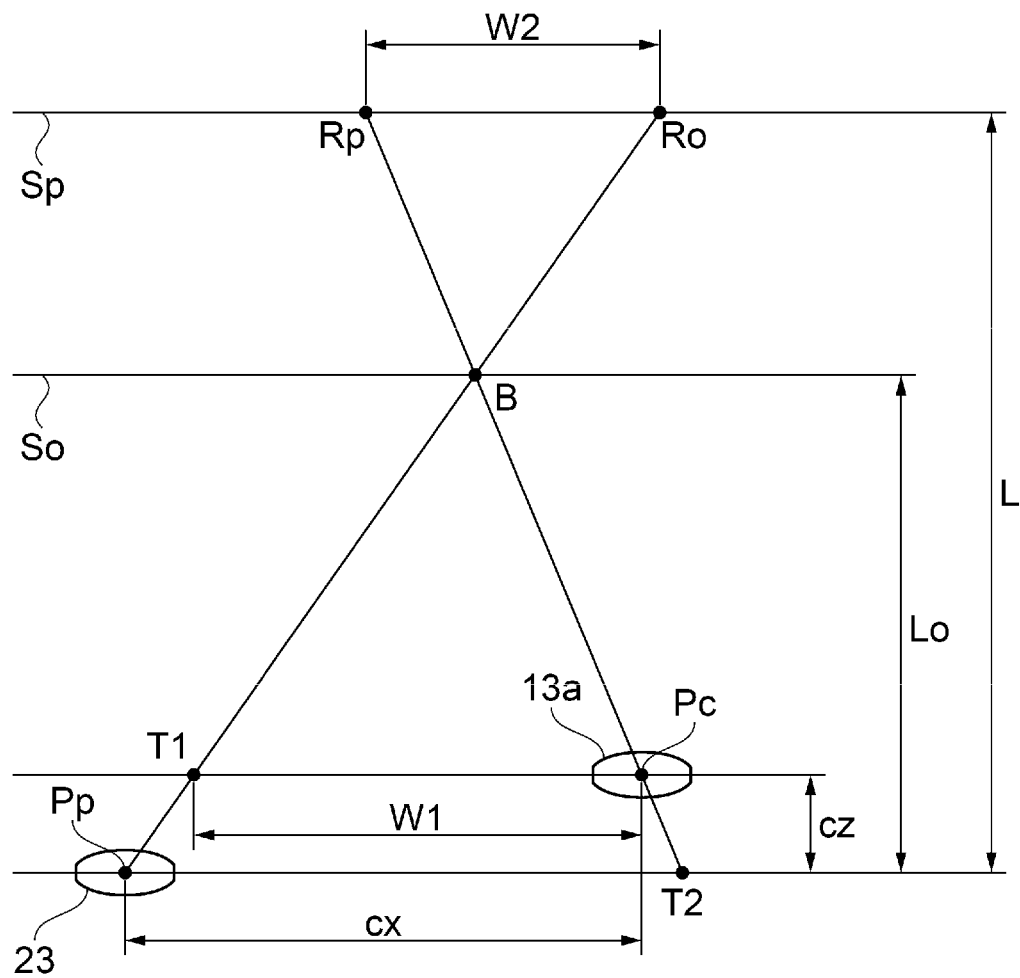
FIG. 9 is a descriptive diagram for describing calculation of a projection distance.

FIG. 9 is a descriptive diagram for describing the calculation of the projection distance L and is a diagrammatic view showing the positional relationship between the projector and the projection surface Sp. The diagrammatic view corresponds to a plan view of the projector 1 and the projection surface Sp viewed from the −Y side.

The position of the projection system 23 of the projector 1 is expressed by a point Pp, and the position of the imaging optical system 13a of the imager 13 is expressed by a point Pc, as shown in FIG. 9. The imaging optical system 13a is separate from the projection system 23 by a distance cx in the direction +X and a distance cz in the direction +Z. A point Ro on the projection surface Sp represents the position where the predetermined one reference point is displayed when the calibration image Gc is projected via the image projection section 18. The reference point is used to calculate the projection distance L and is therefore hereinafter also referred to as a "projection distance reference point." In the present embodiment, the center reference point out of the 5×5=25 reference points is used as the projection distance reference point. Let T1 be the intersection of the straight line passing through the point Pc and parallel to the axis X and the path along which the projection distance reference point is projected, that is, the straight line passing through the points Pp and Ro, and let W1 be the distance between the points T1 and Pc.

A reference projection surface So is a projection surface used in post-manufacturing step adjustment performed after the projector 1 is manufactured but before the projector 1 is shipped, and the reference projection surface So is set in a position separate from the projection system 23 by a predetermined distance Lo in the direction +Z. When the calibration image Gc is projected on the reference projection surface So in the post-manufacturing step adjustment, the projection distance reference point is displayed at a point B on the reference projection surface So. The point B is located at the intersection of the straight line passing through the points Pp and Ro and the reference projection surface So.

Now, let Rp be the intersection of the projection surface Sp and the path along which an image of the projection distance reference point is captured in the post-manufacturing step adjustment, that is, the straight line passing through the points Pc and B, and let W2 be the distance between the points Ro and Rp on the projection surface Sp. Under the above definitions, the triangle having vertices that coincide with the points Ro, Rp, and B is similar to the triangle having vertices that coincide with the points T1, Pc, and B. The following Expression (1) is therefore satisfied.

$$(L-Lo)/(Lo-cz)=W2/W1 \qquad (1)$$

In Expression (1), the distances Lo and cz are known values. The distance W1 is a value calculatable from known information, such as the resolution of the liquid crystal light valves 22R, 22G, and 22B and the angle of view of the projection system 23, in addition to the known values described above. The coordinates of the point Ro in the projection image Ip are the coordinates of the projection distance reference point in the projection image Ip and are known. Since the point Rp is present on an extension of the straight line passing through the points Pc and B, the coordinates of the point Rp in the projection image Ip are determined by performing projection conversion using the projection conversion coefficients described above on the coordinates of the point B in the captured image produced when the imager 13 captures an image of the calibration image Gc in the post-manufacturing step adjustment, that is, the coordinates of the projection distance reference point in the captured image produced in the manufacturing step adjustment. The distance between the points Ro and Rp in the projection image Ip is thus determined, and the thus determined distance in addition to the known information allows calculation of the distance W2 on the projection surface Sp.

The projection distance calculator 44 calculates the projection distance L by deriving the values described above and substituting the values into Expression (1). The projection distance L calculated by the projection distance calculator 44 is stored in the storage 11 and used by the error corrector 34 to correct the error e. As described above, the projection distance calculator 44 of the computing section 10c calculates the projection distance L by using the coordinates of the projection distance reference point contained in the captured image Cc produced when the imager 13 captures an image of the calibration image Gc and the projection conversion coefficients produced based on the captured image Cc. That is, the projection distance calculator 44 calculates the projection distance L based on the captured image Cc produced when the imager 13 captures an image of the calibration image Gc.

Figure 10:
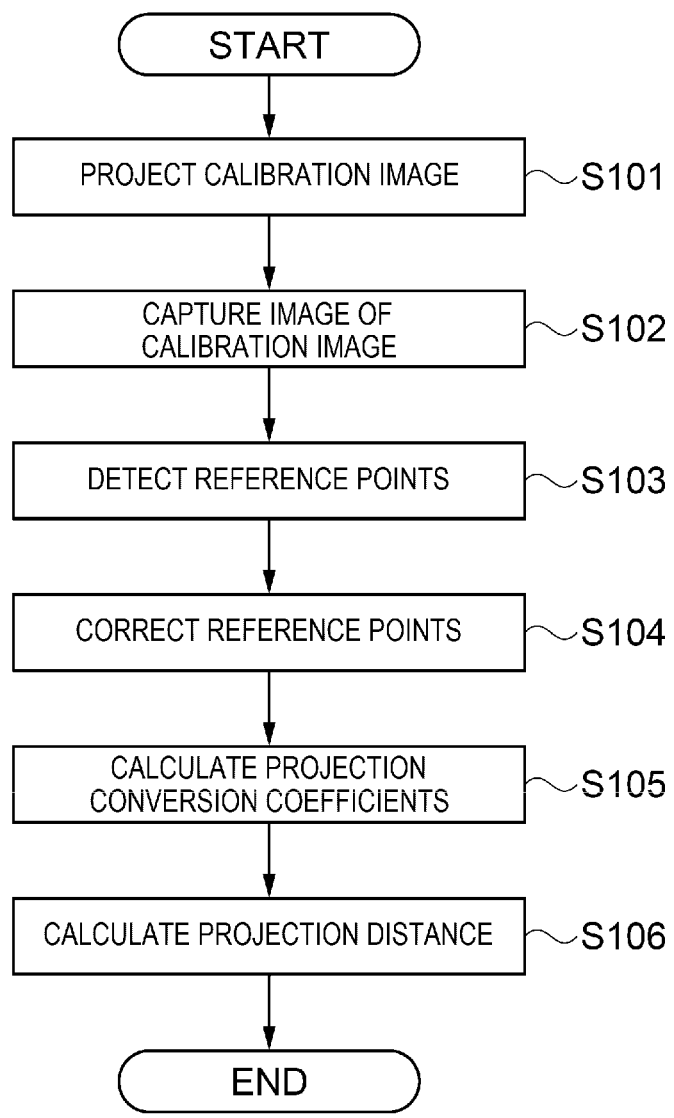
FIG. 10 is a flowchart showing the action of a controller that performs calibration.

FIG. 10 is a flowchart showing the action of the controller 10 that performs the calibration.

When the user instructs execution of the calibration, the controller 10 acts in accordance with the procedure shown in FIG. 10.

In step S101, the controller 10 causes the image projection section 18 to project the calibration image Gc on the projection surface Sp, and in step S102, the controller 10 instructs the imager 13 to capture an image of the projected calibration image Gc, as shown in FIG. 10. In step S103, the reference point detector 41 of the computing section 10c detects the 25 reference points in the captured image of the calibration image Gc. In step S104, the lens distortion corrector 42 of the computing section 10c corrects the distortion that results from the characteristics of the imaging optical system 13a and occurs at the detected reference points. In step S105, the conversion information calculator 43 of the computing section 10c calculates the projection conversion coefficients based on the corrected reference points. Then, in step S106, the projection distance calculator 44 of the computing section 10c calculates the projection distance L. The calibration is thus completed.

Thereafter, the projector 1 starts projecting the projection image Ip based on the image information supplied from the image supplier 3 and detects the pointing position at which the light emitting pen 2 has pointed based on the captured image captured by the imager 13. The detected pointing position undergoes the projection conversion using the projection conversion coefficients calculated based on the calibration and is corrected based on the projection distance L. The drawing section 10b then produces the drawn image Id based on the corrected pointing position.

As described above, the projector 1, the image display system 100, and the methods for controlling the projector 1 and the image display system 100 can provide the following effects.

(1) According to the present embodiment, the computing section 10c calculates both the projection conversion coefficients and the projection distance L based on the captured image Cc produced by capturing an image of the single calibration image Gc, whereby the period required for the initialization can be shortened.

(2) According to the present embodiment, the error corrector 34 of the detecting section 10a corrects the pointing position based on the projection distance L, whereby the pointing position detection accuracy can be improved.

(3) According to the present embodiment, the drawing section 10b produces the drawn image Id based on the trajectory of the pointing position corrected by using the projection distance L, whereby the drawn image Id can be accurately produced.

Variations

The embodiment described above may be changed as follows.

The embodiment described above has been presented with reference to the case where the single calibration image Gc contains 25 reference points. The number of reference points is not limited to 25 and may instead be smaller than 25 or greater than or equal to 26. Further, the marks Mc may each have an arbitrary shape as long as the reference points are identifiable.

In the embodiment described above, the projection distance calculator 44 calculates the projection distance L by using the fact that the triangle having vertices that coincide with the points Ro, Rp, and B is similar to the triangle having vertices that coincide with the points T1, Pc, and B, but not necessarily. For example, let T2 be the intersection of the straight line passing through the point Pp and parallel to the axis X and the path along which an image of the projection distance reference point is captured, that is, the straight line passing through the points Pc and B, and the projection distance L may be calculated by using the fact that the triangle having vertices that coincide with the points Ro, Rp, and B is similar to the triangle having vertices that coincide with the points Pp, T2, and B in FIG. 9.

The embodiment described above has been presented as the aspect in which the error corrector 34 corrects the error e by using the projection distance L calculated by the projection distance calculator 44, and the calculated projection distance L may be used for other purposes. For example, the brightness threshold used by the infrared light detector 31 to detect the infrared light emitted from the light emitting pen 2 may be changed in accordance with the projection distance L. Further, the brightness of the light outputted from the light source 21 may be changed in accordance with the projection distance L.

The embodiment described above has been presented with reference to the case where the projector 1 includes the controller 10, the imager 13, the image projection section 18, and other components are integrated with one another, and all the components may be separate from one another, or part of the components may be separate from the remainder. It is, however, necessary that the positional relationship between the imager 13 and the image projection section 18 is known in order to calculate the projection conversion coefficients and the projection distance L based on the calibration. Further, the fact that the positional relationship among the components described above is known may allow a configuration in which the distance between the imager 13 and the projection surface Sp is calculated in place of the projection distance L. In other words, when the positional relationship between the imager 13 and the image projection section 18 is known, calculating the distance between the imager 13 and the projection surface Sp is equal to calculating the projection distance L, which is the distance between the image projection section 18 and the projection surface Sp.

The embodiment described above has been presented with reference to the case where the light emitting pen 2 is used as the pointing element, but the pointing element is not limited to the light emitting pen 2 and may instead, for example, be a nonluminous pointing element, such as the user's finger and a pointing rod. In the case where a nonluminous pointing element is used, a method for detecting the pointing position at which the nonluminous pointing element has pointed can, for example, be a method for radiating infrared light in the form of a flat plane along the projection surface Sp in such a way that the infrared light covers the entire region of the projected projection image Ip and searching the captured image captured by the imager 13 to detect the infrared light reflected off the pointing element. Also in this case, an error in the pointing position resulting from the distance between the projection surface Sp and the infrared light in the form of a flat plane can be corrected by using the calculated projection distance L.

In the embodiment described above, the transmissive liquid crystal light valves 22R, 22G, and 22B are used as the light modulators, and reflective light modulators, such as reflective liquid crystal light valves, can instead be used. Further, a digital mirror device or any other similar device that includes micromirrors as pixels and modulates the light outputted from the light source 21 by controlling the direction in which the incident light exits on a micromirror basis. Moreover, the configuration in which a plurality of light modulators are provided on a color light basis is not necessarily employed, and a single light modulator may modulate a plurality of color light fluxes in a time division manner.

Contents derived from the embodiment will be described below.

A projector is a projector that detects a pointing position at which a pointing element has pointed and includes a projection section that projects a projection image on a projection surface, an imager that captures an image of the projection surface to produce a captured image, a controller that causes the projection section to project a calibration image as the projection image and causes the imager to capture an image of the projected calibration image, a computing section that calculates conversion information for converting a position in the captured image into a position in the projection image based on the captured image produced when the imager captures an image of the calibration image, and a detector that detects the pointing position in the projection image based on the captured image produced when the imager captures an image of the pointing element that points at the projection surface and the conversion information calculated by the computing section, and the computing section calculates a projection distance that is the distance between the projector and the projection surface based on the captured image produced when the imager captures an image of the calibration image.

According to the configuration described above, the computing section calculates both the conversion information and the projection distance based on the captured image produced by capturing an image of the single calibration image, whereby the period required for the initialization can be shortened.

In the projector described above, the detector may correct the detected pointing position by using the calculated projection distance.

According to the configuration described above, the detector corrects the pointing position based on the projection distance, whereby the pointing position detection accuracy can be improved.

The projector described above may further include a drawing section that produces a drawn image based on the trajectory of the pointing position corrected by the detector using the projection distance and a combiner that combines the drawn image produced by the drawing section with the projection image.

According to the configuration described above, the drawing section produces the drawn image based on the trajectory of the pointing position corrected by using the projection distance, whereby the drawn image can be accurately produced.

An image display system is an image display system that detects a pointing position at which a pointing element has pointed and includes a projection section that projects a projection image on a projection surface, an imager that captures an image of the projection surface to produce a captured image, a controller that causes the projection section to project a calibration image as the projection image and causes the imager to capture an image of the projected calibration image, a computing section that calculates conversion information for converting a position in the captured image into a position in the projection image based on the captured image produced when the imager captures an image of the calibration image, and a detector that detects the pointing position in the projection image based on the captured image produced when the imager captures an image of the pointing element that points at the projection surface and the conversion information calculated by the computing section, and the computing section calculates a projection distance that is the distance between the projection section and the projection surface based on the captured image produced when the imager captures an image of the calibration image.

According to the configuration described above, the computing section calculates both the conversion information and the projection distance based on the captured image produced by capturing an image of the single calibration image, whereby the period required for the initialization can be shortened.

In the image display system described above, the detector may correct the detected pointing position by using the calculated projection distance.

According to the configuration described above, the detector corrects the pointing position based on the projection distance, whereby the pointing position detection accuracy can be improved.

The image display system described above may further include a drawing section that produces a drawn image based on the trajectory of the pointing position corrected by the detector using the projection distance and a combiner that combines the drawn image produced by the drawing section with the projection image.

According to the configuration described above, the drawing section produces the drawn image based on the trajectory of the pointing position corrected by using the projection distance, whereby the drawn image can be accurately produced.

A method for controlling an image display system is a method for controlling an image display system that includes a projection section that projects a projection image on a projection surface and an imager that captures an image of the projection surface to produce a captured image and detects a pointing position at which a pointing element that points at the projection surface has pointed, the method including causing the projection section to project a calibration image as the projection image, causing the imager to capture an image of the projected calibration image, calculating conversion information for converting a position in the captured image into a position in the projection image based on the captured image produced when the imager captures an image of the calibration image, detecting the pointing position in the projection image based on the captured image produced when the imager captures an image of the pointing element that points at the projection surface and the calculated conversion information, and calculating a projection distance that is the distance between the projection section and the projection surface based on the captured image produced when the imager captures an image of the calibration image.

According to the configuration described above, both the conversion information and the projection distance are calculated based on the captured image produced by capturing an image of the single calibration image, whereby the period required for the initialization can be shortened.

In the method for controlling an image display system described above, the detected pointing position may be corrected by using the calculated projection distance.

According to the configuration described above, the pointing position is corrected based on the projection distance, whereby the pointing position detection accuracy can be improved.

The method for controlling an image display system described above may further include producing a drawn image based on the trajectory of the pointing position corrected by using the projection distance and combining the produced drawn image with the projection image.

According to the configuration described above, the drawn image is produced based on the trajectory of the pointing position corrected by using the projection distance, whereby the drawn image can be accurately produced.

What is claimed is:

1. A projector that detects a pointing position at which a pointing element has pointed, the projector comprising:
    a projection section that projects a projection image on a projection surface;
    an imager that captures an image of the projection surface to produce a captured image;
    a controller that causes the projection section to project a calibration image as the projection image and causes the imager to capture an image of the projected calibration image;
    a computing section that calculates conversion information for converting a position in the captured image into a position in the projection image based on the captured image produced when the imager captures an image of the calibration image; and
    a detector that detects the pointing position in the projection image based on the captured image produced when the imager captures an image of the pointing element that points at the projection surface and the conversion information calculated by the computing section,
    wherein the computing section calculates a projection distance that is a distance between the projector and the projection surface based on the captured image produced when the imager captures an image of the calibration image.

2. The projector according to claim 1,
    wherein the detector corrects the detected pointing position by using the calculated projection distance.

3. The projector according to claim 2, further comprising:
    a drawing section that produces a drawn image based on a trajectory of the pointing position corrected by the detector using the projection distance; and
    a combiner that combines the drawn image produced by the drawing section with the projection image.

4. A projector according to claim 1, wherein the projection distance is calculated using a projection distance reference point in the calibration image projected by the projection section on the projection surface.

5. A projector according to claim 4, wherein the calibration image includes an array of reference points having a central position, and the projection distance reference point is located at the central position of the array of reference points.

6. An image display system that detects a pointing position at which a pointing element has pointed, the image display system comprising:
    a projection section that projects a projection image on a projection surface;
    an imager that captures an image of the projection surface to produce a captured image;
    a controller that causes the projection section to project a calibration image as the projection image and causes the imager to capture an image of the projected calibration image;
    a computing section that calculates conversion information for converting a position in the captured image into a position in the projection image based on the captured image produced when the imager captures an image of the calibration image; and
    a detector that detects the pointing position in the projection image based on the captured image produced when the imager captures an image of the pointing element that points at the projection surface and the conversion information calculated by the computing section,
    wherein the computing section calculates a projection distance that is a distance between the projection section and the projection surface based on the captured image produced when the imager captures an image of the calibration image.

7. The image display system according to claim 6,
    wherein the detector corrects the detected pointing position by using the calculated projection distance.

8. The image display system according to claim 7, further comprising:
    a drawing section that produces a drawn image based on a trajectory of the pointing position corrected by the detector using the projection distance; and
    a combiner that combines the drawn image produced by the drawing section with the projection image.

9. A method for controlling an image display system that includes a projection section that projects a projection image on a projection surface and an imager that captures an image of the projection surface to produce a captured image and detects a pointing position at which a pointing element that points at the projection surface has pointed, the method comprising:
    causing the projection section to project a calibration image as the projection image;
    causing the imager to capture an image of the projected calibration image;
    calculating conversion information for converting a position in the captured image into a position in the projection image based on the captured image produced when the imager captures an image of the calibration image;

detecting the pointing position in the projection image based on the captured image produced when the imager captures an image of the pointing element that points at the projection surface and the calculated conversion information; and calculating a projection distance that is a distance between the projection section and the projection surface based on the captured image produced when the imager captures an image of the calibration image.

10. The method for controlling an image display system according to claim 9, wherein the detected pointing position is corrected by using the calculated projection distance.

11. The method for controlling an image display system according to claim 10, further comprising:

producing a drawn image based on a trajectory of the pointing position corrected by using the projection distance; and combining the produced drawn image with the projection image.

\* \* \* \* \*